United States Patent

[11] 3,590,690

| [72] | Inventor | Jacques Maurice Andre Dalbera<br>Colomiers, France |
|---|---|---|
| [21] | Appl. No. | 831,971 |
| [22] | Filed | June 10, 1969 |
| [45] | Patented | July 6, 1971 |
| [73] | Assignee | Sud-Aviation Societe Nationale de<br>Constructions Aeronautiques<br>Paris, France |
| [32] | Priority | June 11, 1968 |
| [33] | | France |
| [31] | | 154504 |

[54] DOUBLE SLIDE-VALVE TYPE SERVOCONTROL
5 Claims, 11 Drawing Figs.

[52] U.S. Cl. .................................................. 91/444, 244/85
[51] Int. Cl. ....................................................F15b 13/04, B64c 13/40

[50] Field of Search................................................ 91/444, 448; 244/85

[56] References Cited
UNITED STATES PATENTS

| 2,515,475 | 7/1950 | Shoemaker.................. | 91/448 (X) |
| 3,164,064 | 1/1965 | Carson ......................... | 91/448 (X) |
| 3,253,613 | 5/1966 | Richolt......................... | 244/85 (X) |

Primary Examiner—Allan D. Herrmann
Attorney—Waters, Roditi, Schwartz & Nissen

ABSTRACT: The invention relates to a servocontrol comprising two slide-valves connected in series hydraulically and in parallel mechanically by being coupled to a differential control element.

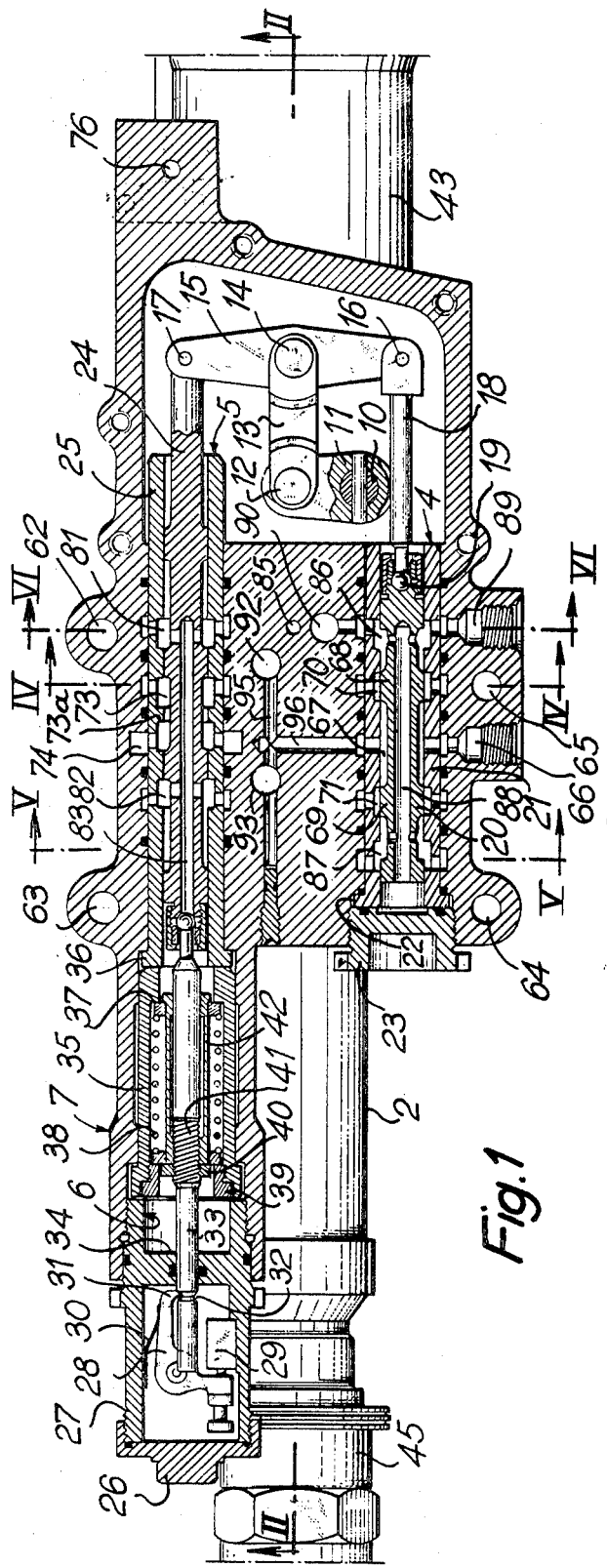

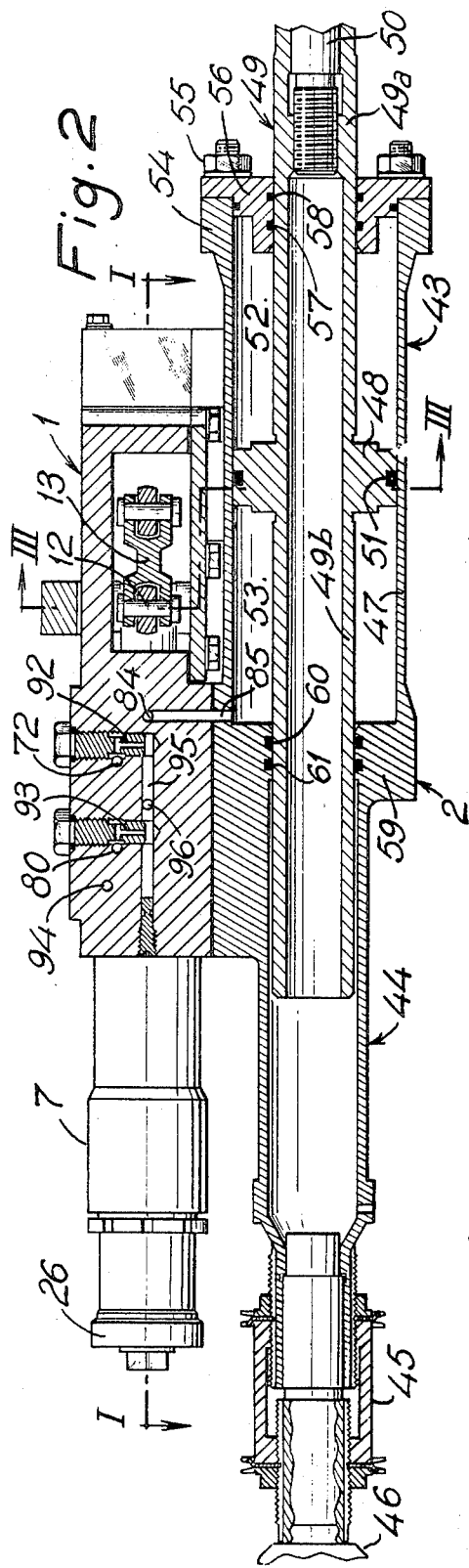
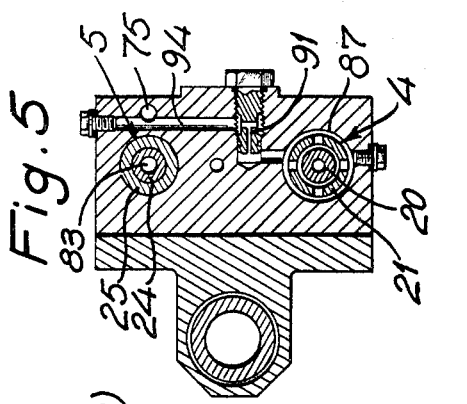
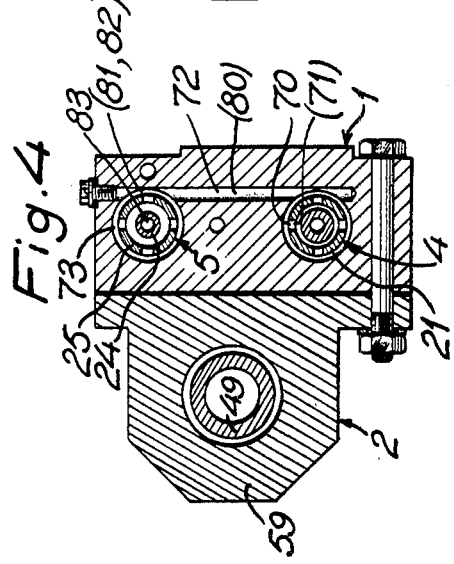
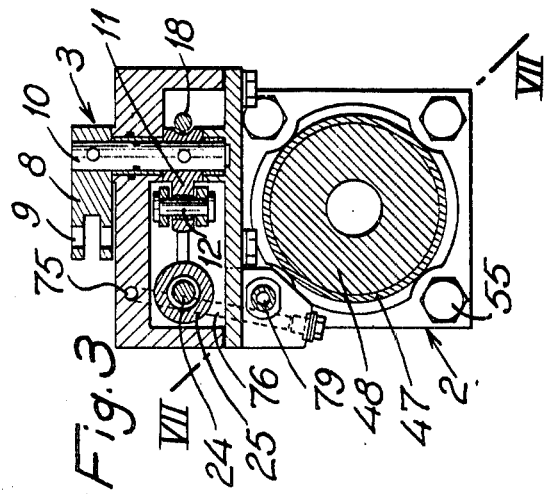

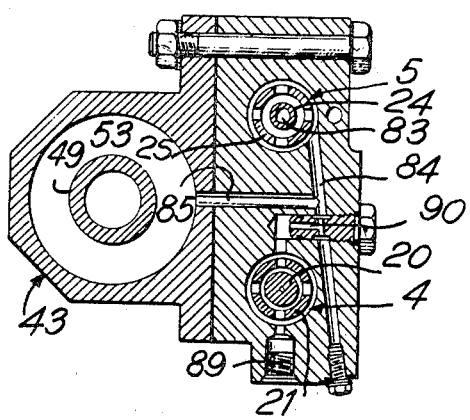
Fig. 6
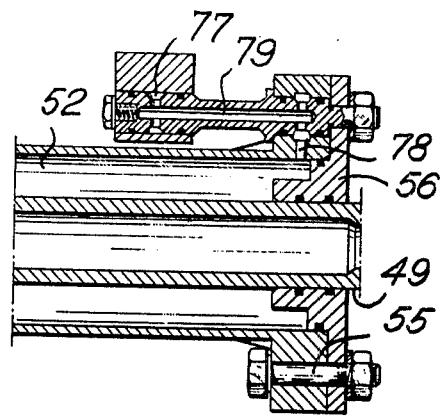
Fig. 7
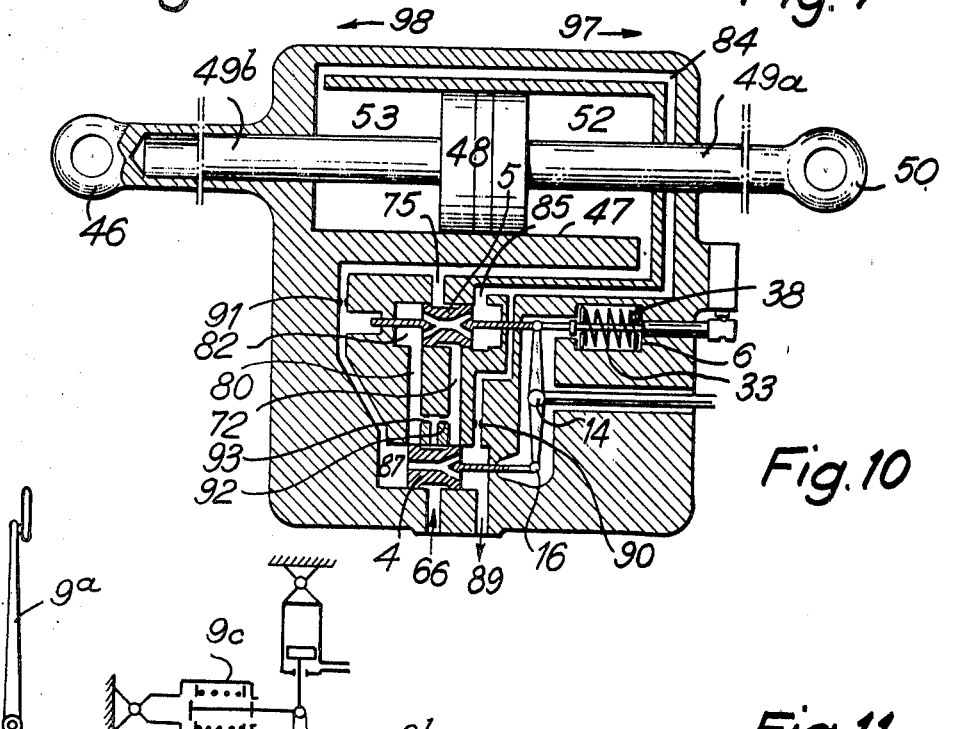
Fig. 10
Fig. 11
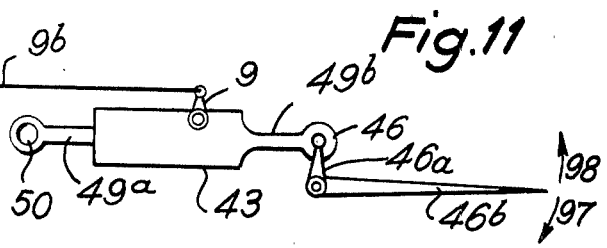
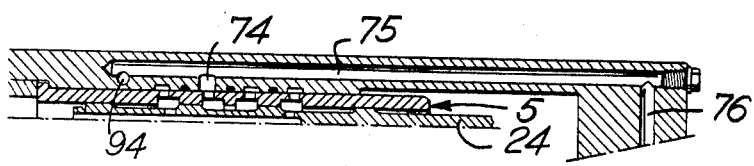
Fig. 8

DOUBLE SLIDE-VALVE TYPE SERVOCONTROL

DESCRIPTION

The servocontrols commonly used on aircraft, particularly on aircraft capable of high flight speeds, make it possible to develop, responsively to a normal maneuver by the pilot, the large forces required to move the control surfaces for example, the necessary motive power being supplied by a source of electric current or pressurized fluid and being suitably proportioned.

In the event of control of an output element by hydraulic means, the servocontrol includes a hydraulic actuating device activated by a slide-valve which is itself operated by a control member.

Utilization in flight, especially under present conditions, makes it necessary to reduce to a minimum the consequences of the possible failure of a servocontrol. Seizure in a slide-valve, in particular, could have disastrous results.

Various solutions have been proposed to enable a maneuver such as the extension or activation of an aerodynamic control surface for instance to be performed despite failure of a servocontrol (notably as the result of the seizure or binding on a slide valve):

Recourse has been had to duplicated servocontrol with two control circuits. In such cases the pilot's intervention is necessary in order to isolate the malfunctioning servocontrol; however, prior to such intervention a control surface, for instance, may be swung abruptly into the wind by aerodynamic forces.

A so-called triplex system will cover the case of failure of a slide valve without necessitating immediate intervention by the pilot but requires triplicating the servocontrol on each control surface or like element, resulting in often prohibitive bulk and weight as well as high cost.

The present invention relates to a double slide valve type servocontrol which overcomes these disadvantages and which utilizes two slide valves connected in series hydraulically and in parallel mechanically to a differential control member, whereby to neutralize virtually all instances of binding of a normal slide valve while at the same time allowing the associated circuit and the malfunctioning servocontrol to continue to be used.

In one form of embodiment of such a servocontrol, the latter comprises a double slide valve the active elements of which are connected to a beam lever which is connected at its middle to mechanical linkage actuated by a flight control such as a joystick, a control column or a rudder bar and which has its ends respectively connected to a four-way primary slide valve and to a standby secondary distributor held stationary when not operative by a link loaded by a double-acting spring whose elasticity characteristic over its entire travel is in all cases less than the artificial feel threshold and greater than the resistance due to friction in the primary slide valve.

From the hydraulic standpoint, the arrangement in series of the two slide valves is such that, with the distributor system divised in this way, the central space in a primary slide valve be connected to a pressure-fluid inlet and, depending on the position of the slide, to one of the power chambers of a jack via the central space in the secondary slide valve or to the other chamber of the jack via the lateral spaces in said slide valve, and that the two lateral spaces in the primary slide valve permit return flow of the fluid, the slides of said slide valves providing permanent communication between their respective end spaces.

In such a servocontrol, the slide valves are grouped together in a first stage provided with passageways for the pressure-fluid into one or the other of the two chambers of a jack cylinder constituting a second stage adjoining the first stage, such jack being articulated by one end of its casing to an actuatable member such as a bellcrank rigid with a flap for example, the other end of the jack formed by a piston rod protruding therefrom being hingedly connected to a point on the airframe, for instance.

Accordingly, in accordance with the invention, the fluid under pressure entering one of the jack chambers thrusts against a fixedly restrained piston and therefore causes a power reaction of the jack casing and hence of the servocontrol with its first-stage!-forming slide valve bodies rigid therewith.

In such a servocontrol, the aforesaid spring-loaded link is preferably coupled to a warning microswitch which can be actuated by compression of said spring in either direction.

The above-disclosed arrangements offer the advantage of resolving the problem of binding of the normal primary slide valve in its fully or partially open position, i.e. with a flap extended for example with a control surface deflected, while at the same time alleviating the consequences of binding of the slide valve in its closed position.

By the provision of calibrated bleed jets, normally used to warm up the slide valves, the effects of a failure due to binding in the second case mentioned above may be alleviated. This latter improvement is important, for a failure of this kind cannot be cured with conventional servocontrols utilizing slide valves devoid of bleed means.

The description which follows with reference to the accompanying nonlimitative exemplary drawings will give a clear understanding of how the invention can be carried into practice.

In the drawings:

FIG. 1 is a top view with cutaways of the above-disclosed servocontrol system, with a section taken through the plane passing through the two centerlines of the distribution slide valves in the upper stage, which section is indicated by the line I–I in FIG. 2.

FIG. 2 is a corresponding side elevation view with a partial section taken through a plane passing through the centerline of the jack located center the through one stage, which section is indicated by the lines II–II in FIGS. 1 and 9.

FIG. 3 is a section taken through the line III–III of FIG. 2.

FIG. 4 is a composite portrayal of the sections passing respectively through the line IV–IV in FIG. 1, which line is the center plane through one of the outlet ports of the primary slide valve, and through the corresponding center plane of the other outlet port of said primary slide valve.

FIG. 5 is a section taken through the line V–V of FIG. 1.

FIG. 6 is a section through the line VI–VI of FIG. 1.

FIG. 7 is a section through the line VII–VII of FIG. 3.

FIG. 8 is a partial section on an enlarged scale taken through VIII–VIII of FIG. 9.

FIG. 9 is a top view on a reduced scale of a servocontrol according to the present invention.

FIG. 10 is a simplified schematic representation of the said servocontrol.

FIG. 11 is a diagrammatic illustration of the subject servocontrol of the invention and of the arrangement of its various component parts.

In the exemplary embodiment of the servocontrol shown in the drawings, the mechanism comprises tightly adjoining upper and lower stages 1 and 2 respectively, containing a pair of slide valves and a jack cylinder (see FIG. 9).

Upper stage 1 includes a control member 3 (FIG. 3) which actuated a four-way primary slide valve 4 and a standby secondary slide valve 5 fixedly restrained by a link member 11 having a double-acting threshold spring contained in a tubular housing 7 forming an extension of stage 1 (FIG. 1).

Control device 3 includes an arm 8 on the end of which a clevis 9 receives an actuating link 9b, and this arm has its other end pinned to a shaft 10. Shaft 10 passes through the bodyforming upper stage 1 and is pinned therein to a lever 11 having its end hingedly connected by a pivot 12 to a link 13. Carried on the other end of the latter is a pivot 14 supporting the middle of a differential beam-lever whose ends respectively bear articulations 16 and 17.

Through the medium of a link 18 and a ball-joint 19, articulation 16 controls sliding motion of a slide 20 of primary slide valve 4 through a sleeve 21 having its other end rigidly clamped by a flange thereon against a shoulder 22 on the upper-stage body by means of a plug 23 screwed thereinto.

The other articulation 17 on beam-lever 15 rests on the end of the rod of a slide 24 of secondary slide valve 5, which rod slides through a sleeve 25 similarly restrained in the body and coupled via a ball-joint to the moving elements of the device 6.

A screwplug 26 seals off the end of a hollow cylindrical sleeve 27 containing a rocker-catch 28 the heel of which activates a warning microswitch 29. Catch 28 is biased by a spring-blade 30 into the position wherein its tip 31 engages in a groove 32 formed on a bar 33 forming part of said mobile elements. This bar extends leaktightly through a wall 34 inside sleeve 27, the latter being screwed into tubular element 7 with its free end-section bearing against the flange of an intermediate liner 35. The sleeve-remote end of liner 35 bears against a terminal collar 36 of sheath 25 and maintains the same in pressure contact with an associated shoulder on the stage body. Within liner 35 is formed a shoulder 37 which, through the agency of a washer, forms a thrust surface for one end of a spring 38 having its other end maintained in contact, likewise by means of a washer, with a hollow plug 39 screwed into liner 35 and with a nut 40 mounted freely within plug 39 and screwed over a threaded portion 41 of bar 33. Nut 40 likewise bears against the end-section of a sleeve 42 forming an integral spacer-guide for spring 38 and which is in turn screwed over threaded portion 41.

The lower stage 2 comprises a jack 43 extended by a tubular body 44 forming an envelope for a counterpiston-rod to be described hereinafter. Fixed to the end of tubular body 44 by means of a sleeve 45 is a movable clevis 46 connecting jack body 43 to a bellcrank 46a rigid with a controlled member 46b (FIGS. 2 and 11). Jack 43 comprises a cylinder 47 slidably mounted over a fixed piston 48 rigid with a hollow rod 49. The portion 49a of rod 49 extending though the bottom of the cylinder terminates in an eye 50 enabling the servocontrol to be hingedly connected to an airframe for example, whereas counterrod 49b is engaged into tubular element 44, as shown notably in FIG. 2 which depicts the servocontrol in the neutral configuration over its piston 48. Piston 48 is fitted with a seal 51 and divides cylinder 47 into two chambers 52 and 53. At one end, cylinder 47 is provided with a reinforcement 54 forming a securing base (by means of a screw and nut 55) and with an end-closure 56 fitted with seals 57 and 58 positioned inside the bore through which rod 49a passes. The other end of cylinder 47 terminates in a polygonally shaped reinforcement 59 the bore of which is provided with seals 60 and 61 for permitting leaktight sliding motion of counterrod 49b, and this reinforcement 59 forms the base for tubular body 44.

Tapped blind holes 62, 63, 64 and 65 (FIG. 1) located on the longitudinal sides of the two stages 10 and 2 receives screws for securing and tightening the structure of upper stage 1 to the structure of lower stage 2.

A pressure-fluid inlet port 66 feeds the central annular chamber 67 of primary slide valve 4, which chamber is bounded inside sheath 21 between two shoulders 68 and 69 which, in the neutral position of the servocontrol, mask the two outlet ports 70 and 71 formed in the sheath to register with the grooves in the body of primary slide valve 4.

Outlet 70 is connected by a conduit 72 (FIG. 4) to central annular chamber 73 of secondary slide valve 5. Chamber 73 comprises two parts divided by a middle reinforcement 73a, and one of these parts is placed in communication via a port 74 and two ducts 75 and 76 (FIG. 8) and also via ports 77 and 78 (FIG. 7) and a duct 79 (FIG. 7 and 3) with chamber 52 of jack 43. As shown in FIG. 4, the outlet 71 from the primary slide valve is connected by a duct 80 (reference numerals bracketed) similar to duct 72 to end chambers 81 and 82 of secondary slide valve 5, the latter two chambers being kept intercommunicating via an axial duct 83 within slide 24, which duct includes corresponding ports on either side of the ridges formed on said slide.

Extending from end chamber 81 of this slide valve are ducts 84 and 85 (FIG. 6) leading to chamber 23 of jack 43.

Depending on the direction of motion of the primary slide in relation to its sheath, the two end chambers 86 and 87 of the primary slide valve, which intercommunicate permanently via ports in slide 20 and an associated axial duct 88, ensure the return flow, via chamber 86, of the fluid up to a return orifice 89 formed in the body of stage 1.

The two slide valves are warmed up by means of a permanent bleed passing through four jets:

A jet 90 (FIG. 6) located between the feed means provided by duct 84 of jack chamber 53 and the circuit leading up to the return orifice 89 by way of primary slide valve and chamber 86, through the agency of an exit conduit from jet 90 extending into this space.

A jet 91 (FIG. 5) located between the circuit feeding chamber 52 of jack 43, through the medium of a conduit 94 extending into conduit 75 and by means of a jet exit conduit terminating in chamber 87 of primary slide valve 4, but connected via duct 88 with return orifice 89.

A jet 92 (FIGS. 1 and 2) located between the outlet port 70 from primary slide valve 4 and the central annular chamber of secondary slide valve 5, by virtue of its communication with conduit 72 (FIG. 2).

A jet 93 located between the outlet port 71 from primary slide valve 4 and the end chamber 82 of secondary slide valve 5, by virtue of its communication with conduit 80 (FIG. 2).

The two jets 92 and 93 are fed in parallel irrespective of the direction of motion, via a longitudinal duct 95 connected to the central annular chamber 67 of primary slide valve 4 through the medium of a transverse duct 96 (FIGS. 1 and 2).

For a clearer understanding of the manner of operation of the subject device of this invention, fence may also be had to the diagrams in FIGS. 10 and 11.

In normal operation and at rest, the servocontrol is in the neutral position shown in FIGS. 1 and 2 in particular. It is supplied with fluid under pressure through orifice 66. The arrow 97 in FIG. 10 shows the direction of rightward displacement of the block consisting of the two stages 1 and 2, and arrow 98 indicates a leftward displacement. If the pilot of the aircraft on which the servocontrol is mounted moves a flight control 9a connected to a rigid rod 9b (to which is connected the artificial feel system 9c schematically represented by a double-acting spring-loaded link- and a hydraulic jack the feed pressure to which is referenced to some function of the speed or Mach number) whereby to actuate lever 9 and shift it in the direction of arrow 97 for example, the hinge point 12 of lever 11 will be moved in the same direction, so that the link 13 will act through hinge point 14 to shift beam-lever 15 in such manner that secondary slide valve 5, the slide 24 of which is restrained by the threshold-operation of the double-acting spring-loaded link, as its articulation point 17 form a fixed point. As a result, only articulation point 16 is shifted, thus causing slide 20 to move in the same direction 97. This is due to the fact that the threshold inherent in the spring-loaded link provides a restaining force greater than the friction effects between slide 20 and sheath 21 and stems from the elasticity characteristics imparted to spring 38.

The shoulder 68 of slide 20 uncovers outlet port 70, allowing it to be fed from central chamber 67, whereby the pressure-fluid flows via duct 72, enters central annular chamber 73 of secondary slide valve 5, and thereafter, via port 74, feeds ducts 75, 76, port 77, tube 79 and orifice 78 before reaching chamber 52 of jack 43.

As it thrusts against fixed piston 48, this incoming pressure-fluid causes movable element 43 to shift also in the direction 97, thereby causing deflection or displacement of the flight control 46b, or of any other member such as a flap affecting the conditions of flight of the aircraft.

At the same time, the fluid in chamber 53 of cylinder 47 is driven through conduit 85 and 84 into end chamber 81 of secondary slide valve 5, whence, having flowed through interior bore 83 and end chamber 82, it flows via duct 80 and the port 71 (uncovered by the sliding motion of slide 20) into end chamber 87 of primary slide valve 4 and thereafter through the internal duct 88 of said slide into the opposite end chamber 86 and ultimately through return orifice 89.

Manifestly, a displacement of member 9a in the opposite direction shown by arrow 98 would result in a displacement of the primary slide valve and the servocontrol's moving compound in the opposite direction, with opposite fluid flows to those described.

Assuming binding to occur and primary slide valve 4 to be jammed in the open position, say, then a partial displacement in the direction 97, for instance, will cause the fluid pressure to be exerted in jack chamber 52 if annular chamber 67 continues to communicate with outlet port 70 in that jammed position.

If the pilot arrests the movement of member 9a, the servocontrol whose primary slide valve 4 has remained open will thus continue to be supplied and will consequently pursue its movement in the same direction 97.

When the pilot restrains member 9a in the position he deems suitable for executing the desired maneuver, hinge point 14 of beam-lever 15 will be likewise restrained but, due to the jamming of slide 20 in sheath 21, articulation point 16 of said beam-lever will continue to follow the motion of the servocontrol's mobile compound, thus necessarily shifting articulation point 17 in the direction 98 and driving slide 24 into its sheath 25. This penetration of slide 24 causes the ports in chambers 73 and 82 to be masked by the shoulders of slide 24, resulting in closure of the interconnecting passageways with jack chambers 52 and 53 and consequent immobilization of said compound.

In this operating mode spring 38 is kept compressed and a warning is given by microswitch 29.

If the pilot ceases his pressure on the flight control, the artificial feel device 9c tends to move articulation 14 back in the opposite direction, that is to say in the direction 98 opposite to the direction of actuation 97 considered herein, while at the same time compressing spring 38. Since articulation 16 is restrained, articulation 17 is moved in the same direction 98, causing jack chamber 53 to be resupplied and the servocontrol to ultimately revert to its neutral position since the fluid from port 70 (which has remained open) reaches chamber 73 and, because of the sliding motion then imposed on slide 24, flows into chamber 81 and thereafter into chamber 53.

During this time, the fluid in chamber 52 is driven into conduits 79, 76 and 75 up to port 74 (which then communicates with chamber 82 into which conduit 80 debouches) and, through this permanent communication means, reaches port 71 which due to the jamming of slide 20, communicates with chamber 87. The fluid passes via internal duct 88 and reaches return orifice 89.

Taking $a$ as the stroke of secondary slide valve 5 to full closure in either direction, or as the stroke for fully opening primary slide valve 4, and $x$ as the extension distance reached by primary slide 20 in its jammed position, then the servocontrol system will assume a position of equilibrium in which secondary slide valve 5 is closed and the restoring force provided by artificial feel device 9c and by the spring 38 maintaining the secondary slide valve against the flight control member is zero. This position differs from the neutral (trimmed) position by an amount $$y = a - x/2$$

It will be seen that if $x = a$, i.e. when the primary slide valve is jammed in the fully open position, the servocontrol will revert to the trimmed position prior to the maneuver.

If $x$ is not equal to $a$, which implies a situation in which the primary slide valve is jammed in a position providing only partial opening, the pilot will have to trim the flight control member 9a slightly in order to restore the control surface 46b to a balanced position. The pilot can continue to operate control surface 46a and its servocontrol via secondary slide valve 5 at the cost of a slight shift in the forces involved in the law relating the force exerted to displacement of the flight control member, this shift being due to compression of spring 38 in device 6.

He can therefore retain the malfunctioning circuit in conjunction with other load circuits (other servocontrols or slaving circuits).

In another functional mode, the subject servocontrol of this invention also provides a remedy for jamming of the primary slide valve when the latter is in the closed position shown in FIG. 1.

Referring once more to the description given precedingly of the manner of operation in which such jamming can occur, it is possible that following a control force exerted on the point 6 in the direction 97 and shifting of slide 20 of primary slide valve 4 in the same direction 97, the two ridges 68 and 69 may uncover ports 70 and 71, thereby allowing pressure-fluid to be admitted into chamber 52 of jack 43, resulting in a shift, in the direction 97, of the servocontrol casing also.

If the pilot maintains the force he is exerting and the position of flight control member 9a is preserved, articulation 14 remains stationary. The displacement of the servocontrol casing will cause ports 70 and 71 to move back into registry with ridges 68 and 69 in primary slide valve 4. The motion of the servocontrol casing therefore stops, as indicated previously, at a place corresponding to the positional deviation imposed on flight control member 9a, whereby control surface 46b is deflected and kept in that position in obedience to the pilot's wish.

Under these circumstances, and if the pilot has stopped his maneuvering action, if primary slide valve 4 should jam in the closed position into which it has thus been fetched, the system will operate as follow:

If the pilot continues to exert force and obliges the member 9a to remain stationary, nothing will happen so far as the servocontrol is concerned and the control surface will remain deflected. On the other hand, should the pilot stop exerting force, the artificial feel device 9c will tend to restore articulation 14 in the direction 98 opposite to the sense in which the pilot had originally exerted actuating force, and since articulation 16 is kept stationary by the jamming of slide 20, articulation 17 will be displaced in the same direction 98 since the elasticity characteristics of spring 38 are inferior to those of artificial feed device 9c.

Full motion in that direction by slide 24 in secondary slide valve 5 shuts off the intake of bleed fluid from jet 93 into chamber 52, which is then isolated from the pressurized feed circuit.

Chamber 53 of jack 43, on the other hand, continues to be fed by the bleeds from jet 92, via duct 72, through the establishment of intercommunication by displacement of the right-hand shoulder limiting chamber 73 in slide valve 24 by an amount sufficing for the fluid to flow towards orifice 81. In addition, the two chambers 52 and 53 remain in constant communication with the return circuit, via the two jets 90 53 91 connected to chambers 86 and 87 and to orifice 89, chamber 87 being connected thereto via central duct. Because jets 90 and 91 are smaller than the jets 92 and 93, and notwithstanding the permanent leak through jet 90 which has port in the duct 84 feeding chamber 53, the flow rate through jet 92 into duct 84 is sufficient to cause pressure to build up in the chamber 53, causing the servocontrol casing to move in the direction 98, and is enough to restore said casing into its neutral position. The fluid driven from chamber 52 passes through jet 91 and likewise reaches return orifice 89.

In the case of a control surface, for example, the aerodynamic force thereon can accentuate and speed up such restoration, without however exceeding a rate limited by the flow through jet 91 in particular, whereby abrupt restoration of the control surface into the wind is avoided.

When the neutral position has been reached, the secondary slide valve reverts to its initial position as shown in FIG. 1.

Since the pilot will again have been warned of this particular type of malfunction, through operation of microswitch 29, two alternatives are open to him:

Eliminate the malfunctioning hydraulic circuit if duplicated servocontrols with independent circuits are provided.

Continue to use the servocontrol whose primary slide valve 4 has jammed in the closed position to nevertheless obtain slow and small movements, by retaining the possibility of obturating the fluid inlets 92 and 93 into one or the other of chambers 52 and 53 of jack 43, at either end of secondary slide valve slide 24.

The above-described arrangements provide remedies against virtually all instances of possible binding of the normal primary slide valve, notably in the totally or partially open position thereof, by retaining use of the circuit and the failed servocontrol. Although a complete remedy for jamming of the primary slide valve in the closed position is not provided, the consequences of this contingency are alleviated by comparison with conventional servocontrols with bleedless slides, for which no remedy exists.

The arrangements hereinbefore described consequently permit, firstly, of improved safety since the binding of a slide valve, though signalled to the pilot, calls for no immediate action on his part and will cause no undesirable or inadvertent motion by the aircraft, as happens in the case of twin-bodies servocontrols for instance, in which the control surface is suddenly retracted into the relative airstream by the aerodynamic force.

In addition, a multiplication of the servocontrols is avoided, which avoids systems of the so-called "triplex" kind which, while covering the contingency of a slide valve malfunction without requiring immediate action by the pilot, nevertheless necessitate triplication of the servocontrols on each control surface or like movable member, which is cumbersome and costly.

It goes without saying that many changes and substitutions of parts may be made in the specific embodiments described hereinabove without departing from the scope of the invention.

I claim:

1. A hydraulic servocontrol comprising a jack, a casing, two slide valves in said casing for controlling operation of said jack, said slide valves including respective slide members, a differential control member hydraulically connecting the slide valves in series and mechanically connecting the slide valves in parallel, said differential control member including a beam-lever having extremities respectively hingedly connected to the slide members of said slide valves and having a substantially central articulation point, means mechanically connecting said articulation point to a flight control, and comprising a link pivotably connected to said lever at said substantially central articulation point, a lever arm pivotally supported in said casing, a lever external of said casing and rigidly connected to said lever arm, a flight control linkage hingedly connected to said external lever, said beam-lever having one of its extremities hingedly connected directly to a first slide member of one of said slide valves, and a link hingedly connected to the other extremity of said beam-lever and in turn pivotally connected to a second slide member of the other slide valve.

2. In a hydraulic servocontrol comprising a jack, a casing, first and second slide valves in said casing for controlling operation of said jack, said slide valves including respective slide members and sleeves supporting the slide members, a differential beam-lever hydraulically connecting the slide valves and in series mechanically connecting the slide valves in parallel, said first slide valve being a primary slide valve whose slide member defines four distribution channels jointly with its associated sleeve, the latter sleeve being rigid with said casing, the second slide valve being a secondary slide valve cooperating with its associated sleeve, the latter likewise being rigid with said casing and being formed with ports likewise determining four distribution channels, a central primary slide valve space communicating on the one hand permanently with a pressure fluid inlet and, on the other hand, depending on the position of said primary slide valve, alternately with one of two chambers provided in said jack via a central two-part space in said secondary slide valve and with the other jack chamber via lateral spaces in said secondary slide valve, said primary slide valve having lateral spaces providing a return path for the hydraulic fluid, one of two end chambers provided in said primary slide valve communicating permanently with a pressure-fluid bleed, and the end chambers in each slide valve being interconnected through ports and axial ducts provided in said slide members.

3. A servocontrol as claimed in claim 2 comprising a spring-loaded link connected to said slide member of the secondary slide valve, and also connected to said slide member of the secondary slide valve a rod having a recess therein which cooperates with a spring-latch for activating a warning microswitch.

4. A servocontrol as claimed in claim 2 wherein said jack is rigid with said casing and is provided with passageway means communicating with the chambers of said jack, bleed jets interposed on the one hand between said chambers and said pressure-fluid bleed and on the other hand between an outlet from said central primary slide valve space and, respectively, a central space in the secondary slide valve in the case of one of two inlet jets, and one of said lateral secondary slide valve spaces in the case of the other inlet jet.

5. In a servocontrol as claimed in claim 4 wherein said jack is double-acting and includes a cylinder and a tubular extension thereof, a piston rod connected to a fixed articulation point, a counterrod movable in said tubular extension of the cylinder and an actuating clevis attached to said extension to which movement is imparted as the result of movement of said jack cylinder over its fixed piston rod, said jack cylinder being rigid with the casing of said slide valves.